Aug. 20, 1957  R. M. BYRNE  2,803,818
PULSE TIME DATA REDUCER
Original Filed Oct. 12, 1950  2 Sheets-Sheet 1

INVENTOR.
Robert M. Byrne
BY
ATTORNEY

United States Patent Office 2,803,818
Patented Aug. 20, 1957

2,803,818
PULSE TIME DATA REDUCER

Robert M. Byrne, Hartsdale, N. Y., assignor to Goodyear Aircraft Corporation, Akron, Ohio, a corporation of Delaware Continuation of application Serial No. 189,807, October 12, 1950. This application April 12, 1956, Serial No. 577,913

4 Claims. (Cl. 343—7.3)

This invention relates to an electronic apparatus for producing a D. C. voltage proportional to the time interval between two pulses, and, more particularly, the reduction of radar range data to a D. C. voltage for control and computing purposes.

It is well known in radar practice that range information is obtained by measuring the time a pulse of high frequency radiant energy can travel from a radiator to a target and back to a receiver. Several methods have been heretofore proposed for measuring the time interval between the sending of the pulse and the receiving of the reflected signal pulse.

One such method involves visually matching on a scope the reflected radar pulse with a delay pulse from a known calibrated source, the delay pulse being initiated simultaneously with the radar pulse. The operator varies the delay by means of a calibrated linear potentiometer until the delay pulse matches the reflected pulse and then reads the range directly off the calibrated dial. Such a method, of course, is subject to considerable inaccuracy, is not automatic in its operation, and does not supply information in a form that can be readily fed into an analog computer or the like.

A further refinement of the above-described method is made by operating the linear potentiometer by means of a servo motor responsive to an error voltage produced when the delay time is not matched with the reflected pulse time. However, use of a servo motor has several undesirable limitations normally associated with rotary equipment, such as the inertia factor which cuts down response time, plus wear and maintenance of moving parts.

It is the general object of the invention to avoid and overcome the foregoing and other difficulties of and objections to prior art practices by the provision of an all-electronic pulse time data reducer which requires a comparatively small amount of equipment and is completely automatic in its operation.

Another object of the invention is the provision of a pulse time data reducer which gives a D. C. voltage that is in proportion to the time interval between a generated radar pulse and a reflected pulse.

Another object of the invention is the provision of a pulse time data reducer of improved response time having an accuracy of one-tenth percent of the maximum delay time between the transmitted and reflected radar pulses, that is, the maximum range measurement.

The aforesaid objects of the invention, and other objects which will become apparent as the description proceeds, are achieved by providing in a pulse time data reducer of the type to be described, means for producing a D. C. voltage proportional to the time between successive pulses including a time-delay circuit receiving an initiating pulse, the time-delay circuit producing an output pulse having a time delay proportional to an applied D. C. voltage, a square-wave generator triggered alternately by the initiating pulse and the delayed pulse, said square wave generator feeding a sampling circuit, the sampling circuit receiving a second input pulse and producing an output pulse simultaneously with said second input pulse having a polarity determined by the voltage level of the square wave applied to the sampling circuit at the instant the second impulse is received, a condenser charged by the sampling circuit output pulse an amount determined by the polarity of said output pulse, and an integrating D. C. amplifier responsive to the charge of said condenser, the output voltage of the D. C. amplifier being applied to the time-delay circuit to correct the time delay to such a value that the voltage level of the square wave changes simultaneously with reception of the second input pulse.

For a better understanding of the invention, reference should be had to the accompanying drawings, wherein.

Figure 1:
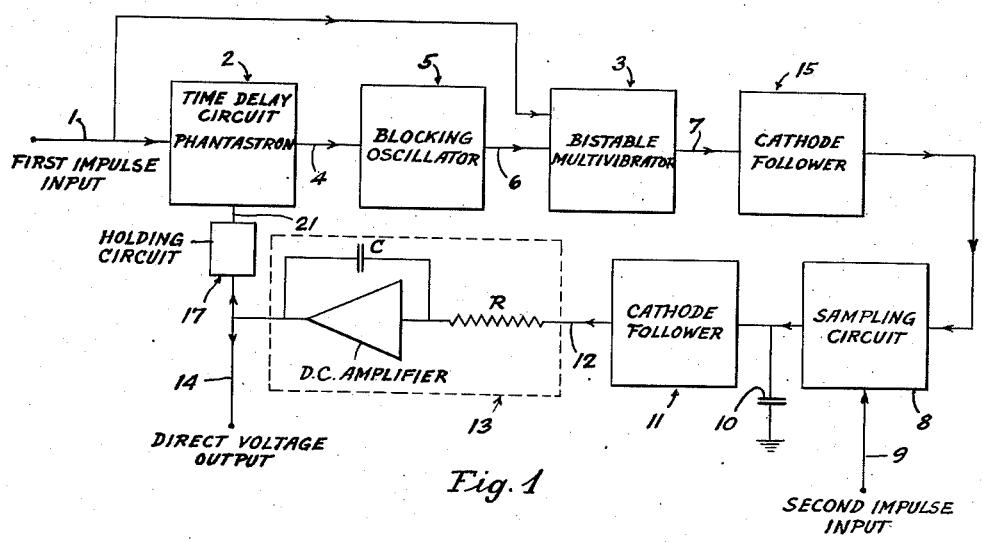
Fig. 1 is a block diagram showing the essential features of the invention.

With particular reference to the form of the invention illustrated in the drawings, a negative pulse is initiated at the input point 1 simultaneously with a transmitted radar pulse beamed at a target. This negative pulse is applied simultaneously to the input of a phantastron time delay circuit 2 and one side of a bistable multivibrator or or square wave generating circuit indicated generally at 3. The phantastron 2 is a circuit well known to the radar art and has the characteristic of producing an output pulse at 4 which is initiated by the input pulse and having a time duration determined by an applied D. C. voltage introduced at the control point 21. Within certain limits, the higher the positive D. C. potential at 21, the longer the time interval between the initiation and termination of the output pulse at 4, this relation being substantially linear. The wave shape of the output pulse at 4 is shown generally in Fig. 3.

The output signal from the phantastron 2 is fed directly into a blocking oscillator circuit indicated generally at 5. The blocking oscillator is triggered when the output signal of the phantastron suddenly drops to zero at the termination of the output pulse at 4. The output of the blocking oscillator at 6 is a sharply peaked pulse of less than a microsecond duration which is applied to the opposite grid of the bistable multivibrator circuit from the initiating impulse at 1.

Figure 3:
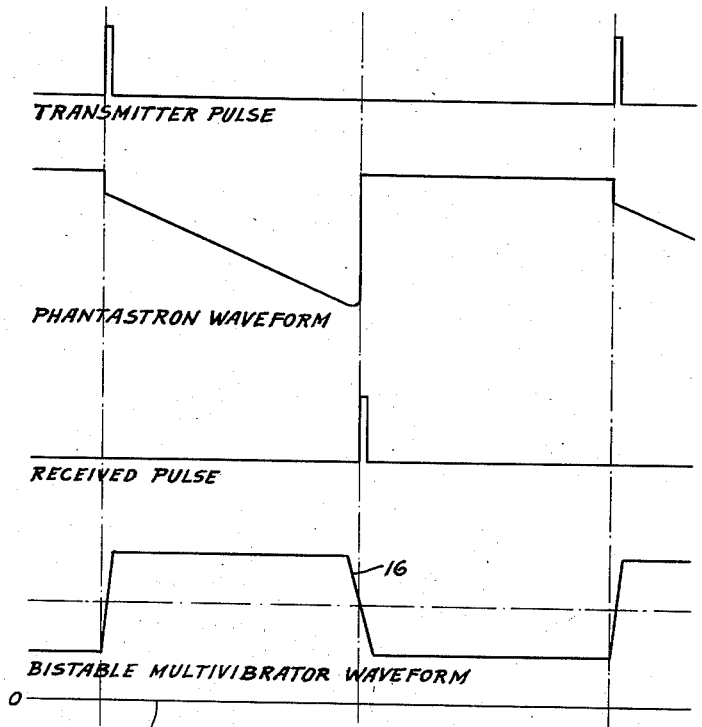
Fig. 3 illustrates the wave form of the signal at various points in the circuit when the error voltage is zero.

The bistable multivibrator or square wave generating circuit shown generally at 3 is of the Eccles-Jordan type having two normal and stable modes of operation. The output signal at 7 of the bistable multivibrator circuit 3 is a square wave as shown in Fig. 3, which is reversed in phase alternately by the input pulse at 1 and the input pulse at 6, the polarity being such that the input pulse at 1 initiates the higher voltage level of the square waves while the delayed pulse at 6 initiates the lower voltage level of the square wave in relation to the zero or ground potential line 20.

Figure 2:
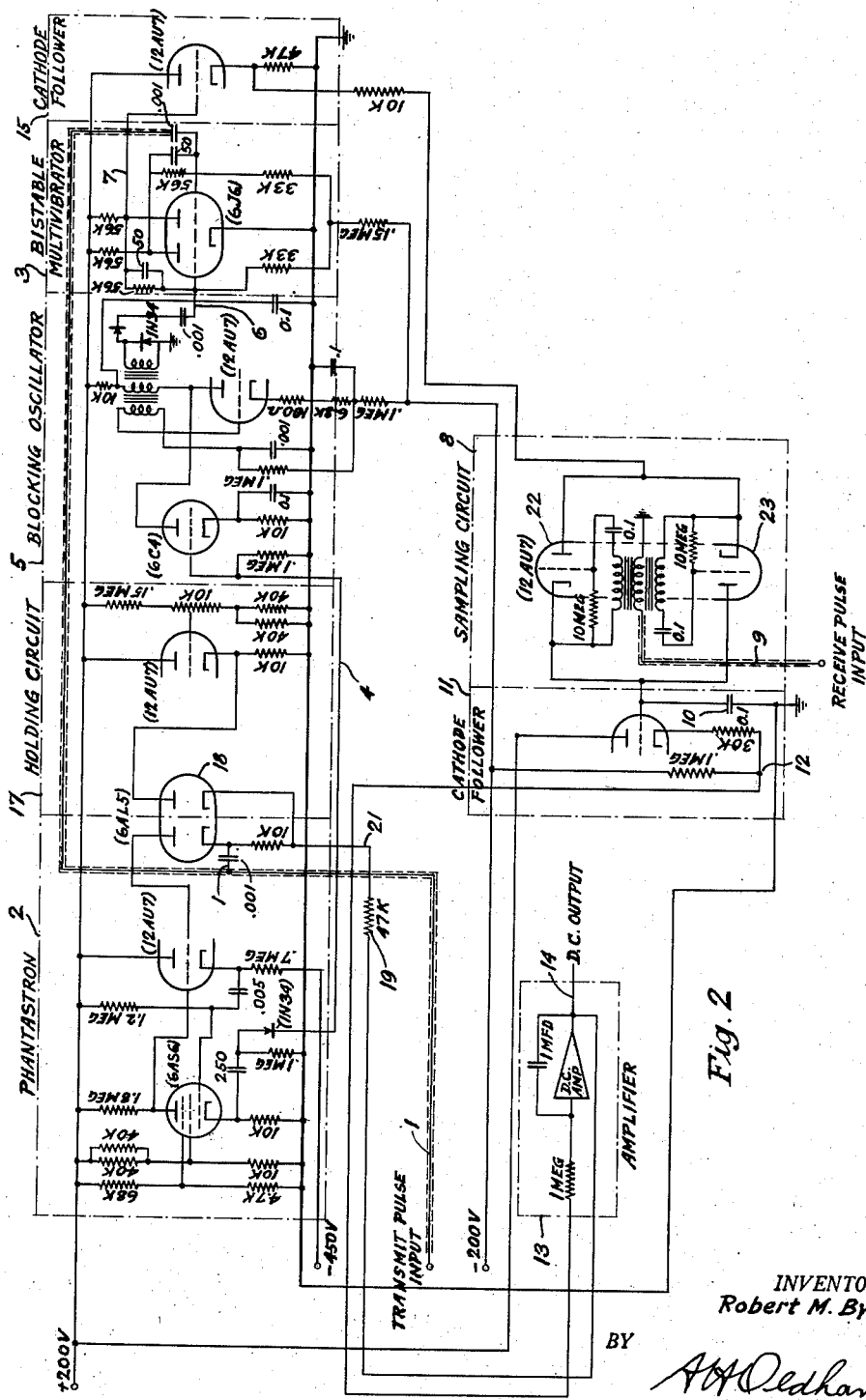
Fig. 2 is a schematic wiring diagram of the invention.

The output of the square wave generator or bistable multivibrator circuit 3 is applied through a cathode follower 15 to a sampling circuit indicated generally at 8. A second input or echo pulse is fed to the sampling circuit at 9 simultaneously with the receiving of the reflected radar signal pulse. The sampling circuit itself is of a type developed in the Bell Laboratories for a pulse code modulation system. (See Fig. 2.) It includes a pair of triodes 22 and 23 connected in inverse parallel arrangement with the input pulse from 9 being applied through a pair of isolation transformers to their respective grids. The circuit is so arranged that the input pulses at 9 hold the grids to cut-off by a self-bias developed across the grid condensers of the dual triodes, cutting the triodes off except during the peak of the pulse.

Current will flow through either triode during the peak of the pulse received at 9 when the grids are driven above cut-off, depending on the potential of the input to the sampling circuit relative to the output potential at condenser 10. The relative potential at the input, of course, is controlled by the output 7 of the bistable multivibrator circuit 3.

The output of the sampling circuit charges the condenser 10 tied to the grid of a cathode follower circuit 11. The cathode of the cathode follower circuit is connected through a voltage divider to a negative source of potential so that the output signal of the cathode follower, taken off the voltage divider at 12, can swing either positively or negatively with respect to ground as the charge on the condenser increases or decreases.

The potential at 12 in the over-all operation of the circuit is an error voltage which stabilizes at zero relative to ground. This error voltage is applied to an integrating type D. C. amplifier 13, the output of which is the desired D. C. voltage proportional to the time interval between the transmitted and reflected radar pulses when the error voltage input is reduced to zero, and is measured at the output point 14. The output voltage at 14 is also applied at the phantastron control point 21 to vary the time delay of the phantastron output whereby the error voltage at 12 is reduced to zero.

When no echo or reflected pulse is being received at 9, it is necessary for proper operation of the phantastron circuit to maintain the D. C. control voltage at a positive potential in excess of approximately thirty volts. If the D. C. control potential applied to the phantastron should drop below this value, the phantastron ceases to function and cannot be restored to proper operation merely by restoring the reflected pulse. This condition is apt to occur particularly when the condenser 10 across the output of the sampling circuit 8 is charged positively so that the output of the integrating D. C. amplifier is decreasing. If, under these conditions, the reception of the reflected pulse received at 9 is interrupted, the output of the integrating D. C. amplifier will continue to decrease and will eventually drift below the thirty-volt level, thereby rendering the phantastron circuit inoperative. For this reason, a holding circuit indicated generally at 17 is incorporated in conjunction with the phantastron. This circuit is so arranged that if the D. C. control voltage drops below a predetermined level, a diode 18 will start to conduct, producing an IR voltage drop across the resistance 19, and maintain the control voltage at 21 at substantially thirty volts above ground.

Even though it is believed the operation of the apparatus will be apparent from the foregoing description, a brief review thereof will now be made for purposes of summary and simplification. It is to be understood that in actual operation, the transmitted radar pulses are released at the rate of 300 to 400 a second, the same number of reflected pulses being received when a target is intercepted. Each pulse is of a duration of less than one microsecond. The first input pulses which are applied at input terminal 1 are initiated simultaneously with the transmitted radar pulses. The first input pulse is applied simultaneously to the bistable multivibrator circuit 3 and the phantastron or delayed pulse circuit 2. The first input pulse triggers the bistable multivibrator circuit 3 so that the output is at a relatively high positive potential. This positive voltage will be applied continuously to the sampling circuit 8 through the cathode follower 15 unil the bistable multivibrator circuit is reversed by the delayed pulse received from the blocking oscillator and phantastron at 6. Assuming for the moment that the second input pulse, corresponding in time to the reflected radar pulse, is received at the input 9 to the sampling circuit before the time the delay pulse is received at 6, the plate of triode 22 of the sampling circuit will be positive with respect to the cathode so that it will conduct momentarily when the peak of the second input pulse received at 9 biases the tube 22 above cut-off. This in turn will charge the condenser 10 positively. It will be understood that as a series of pulses is received at 9, the condenser 10 will be charged to a potential approaching that of the higher voltage level at the input to the sampling circuit.

As condenser 10 becomes charged, the potential at the output of the cathode follower on the voltage divider becomes positive relative to ground. The integrating D. C. amplifier 13, to which this voltage is applied at 12, produces an output voltage at 14 which is constant only when the potential at 12 is zero. As the potential at 12 becomes positive with respect to ground, the D. C. voltage at 14 goes down and when the input potential at 12 becomes negative, the voltage at 14 increases. The rate of increase or decrease depends upon the absolute potential of the input voltage at 12. However, this rate of change can be varied by changing the RC constant of the feed-back circuit. It is necessary to adjust the feed back so that the rate of change of the output voltage of the D. C. integrating amplifier as applied to the control point 21 of the phantastron will not vary too rapidly or too slowly. If the rate of change is too rapid, the overall operation of the circuit becomes unstable with a tendency to "hunt." Overshoot and hunting are due to the fact that the input information is in stepwise form, appearing at a rate equal to the repetition rate of the radar pulse. If the rate of change of the control voltage is too large, the control voltage will change a significant amount in the period between pulses so that it may overshoot and hunt at the pulse repetition rate. If the rate of change is made too slow, the operation of the circuit becomes sluggish, inaccurate, and much too slow to "lock in," the lock-in condition occurring when the input potential to the D. C. amplifier becomes zero. Best operation is found to occur when the maximum lock-in time is a little less than half a second.

Assuming again that there is a positive voltage at 12, the output of the integrating D. C. amplifier in response to this potential decreases, thereby reducing the time delay of the phantastron circuit 2. If the time delay of the phantastron is too short, the delayed pulse at 6 will change the output voltage level of the bistable multivibrator circuit 3 before the second input pulse is received at 9. This renders the input to the sampling circuit negative with respect to the output voltage at the condenser 10, so that the triode 23 of the inverse parallel sampling circuit will now conduct when the second input pulse is received at 9, thereby reducing the charge across the condenser 10. As the condenser 10 is discharged, the potential at 12 drops so that the input to the D. C. amplifier 13 becomes negative with respect to ground, which in turn causes the D. C. output at the control point 21 to increase, thereby lengthening the time delay of the phantastron 2.

Actually the bistable multivibrator circuit 3 requires a finite time of approximately seven microseconds to switch voltage levels so that the wave shape of the output of the bistable multivibrator circuit is not actually a square wave but displays a finite slope 16 in going from the higher to the lower voltage level. The D. C. output voltage of the amplifier 13 as applied at the control point 21 of the phantastron circuit adjusts itself to such value that the bistable multivibrator circuit changes voltage level simultaneously with the receiving of the second input pulse at 9. Since the second input pulse at 9 is of shorter duration than the time interval required for the bistable multivibrator circuit to change voltage level, the input pulse actually will align itself with the mid point of the slope 16 when the circuit stabilizes itself. See Fig. 3.

It will be recognized that the objects of the invention have been achieved by the provision of a pulse time data reducer which is completely automatic in its operation, is all electronic, capable of rapid response without sacrifice of accuracy, and produces a D. C. signal proportional to the time interval between the transmitted and received radar pulse which is readily adapted for range computations or use in analog computers or the like.

The present application is a continuation of application Serial No. 189,807 filed October 12, 1950, now abandoned, and entitled "Pulse Time Data Reducer."

While certain representative embodiments and details have been shown for the purpose of illustrating the invention, it will be apparent to those skilled in this art that various changes and modifications may be made therein without departing from the spirit or scope of the invention.

I claim:

1. A pulse time apparatus of the type described including a terminal for receiving a series of negative, constant-frequency first input pulses, for example, from a radar transmitter, a time delay circuit means connected to the terminal and adapted to pass on a delayed pulse for each first input pulse, the delay time of the delayed pulse being adapted to be controlled by a D. C. voltage, square wave generating means connected to said terminal and to the time delay circuit means and triggered alternately by the series of first input pulses and the series of delayed pulses to produce an output voltage of two different and alternating levels, a second terminal for receiving a series of second input pulses, for example, from a radar receiver, means connected to the second terminal and the square wave generating means and responsive to the voltage level of said square wave generating means and to the series of second input pulses to produce an error voltage of a polarity determined by the voltage level of said square wave generating means at the instant each second input pulse is received, output terminals connected to said last-named means, integrating means connected to said output terminals and responsive to said error voltage for producing a D. C. output voltage which increases or decreases at a rate proportional to the amplitude of said error voltage and in a direction determined by the polarity of said error voltage, means connecting the output of the integrating means to the delay circuit means to correct the time of the delay pulse in a direction to reduce the error voltage to substantially zero, a third terminal connected to the output of the integrating means and adapted to be connected, for example, to an analog computer, said D. C. output voltage after reducing the error voltage to substantially zero comprising an electrical representation of the time between a first input pulse and a second input pulse.

2. Apparatus to produce for a missile-tracing analog computer an electric voltage representation of the time between a transmitted radar pulse and a received radar pulse and including a terminal for receiving each transmitted radar pulse, time delay circuit means connected to the terminal and adapted to pass on a delayed pulse, means connected to the terminal and the output of the time delay circuit means and triggered alternately by each transmitted radal pulse and each delayed pulse to produce an output voltage of two different and alternating levels, a second terminal adapted to receive each received radar pulse, means connected to the second terminal and to the last-named means and responsive to the voltage level of the last-named means at the time of each received radar pulse to produce an error voltage, output terminals connected to said last-named means, means connected to the output terminals for producing a D. C. output voltage increasing or decreasing at a rate proportional to the amplitude of the error voltage and in a direction determined by the polarity of the error voltage, a third terminal adapted to be connected, for example, to an analog computer, and means connecting the output of the last-named means to the third terminal and to the time delay circuit means to correct the time of the delay pulse in a direction to reduce the error voltage to substantially zero.

3. A pulse time data reducer for producing a D. C. voltage proportional to the time between transmitted and received radar pulses comprising time delay circuit means receiving a series of initiating pulses separated by a fixed time interval, for example, from a radar transmitter, said circuit means producing a series of delayed output pulses, each pulse having a time delay proportional to an applied D. C. voltage, terminals connected to the output of said time delay circuit means, a square wave generator connected to said terminals for producing a wave form having two different voltage levels and triggered alternately to the different voltage levels by each initiating pulse and each delayed output pulse, sampling circuit means, said square wave generator feeding said sampling circuit means, said sampling circuit means receiving a series of echo input pulses, for example, from a radar receiver, separated by a variable time interval and producing a series of output pulses each pulse being simultaneous with an echo input pulse and having a polarity determined by the voltage level of the square wave form applied to the sampling circuit means at the instant an echo input pulse is received, output terminals connected to the sampling circuit means, a condenser connected to the output terminals and charged and discharged by each sampling circuit means output pulse and in an amount determined by the polarity of said output pulse, connection terminals connected to the output of the condenser, an integrating D. C. amplifier connected to the connection terminals responsive to the charge of said condenser, means connecting the output of said D. C. amplifier in the time delay circuit means to correct the time delay to such value that the voltage level of the square wave changes substantially simultaneously with reception of an echo input pulse, whereby the output voltage of the D. C. amplifier is automatically adjusted regardless of initial variation in time of the echo input pulse, and in proportion to the time interval between successive initiating and echo input pulses, and holding circuit means in association with the output voltage of the D. C. amplifier to prevent the voltage from dropping below a predetermined level whereby temporary loss of echo input pulses does not effect operation.

4. A pulse time data reducer for producing a D. C. voltage proportional to the time between a plurality of successive pulses including an input terminal connected to the successive pulses, time delay circuit means connected to the input terminal and receiving an initiating input pulse, said circuit producing a delayed output pulse having a time delay proportional to an applied D. C. voltage, terminals connected to the delayed output pulse, a square wave generator connected to the input terminal and to the terminals for producing a wave form having two different voltage levels and triggered alternately to the different voltage levels by each initiating input pulse and each delayed input pulse, output terminals connected to the square wave generator, means connected to the output terminals and responsive to the voltage level of the signal produced by said square wave generator and to a second input pulse whereby an error voltage is produced of a polarity determined by the voltage level of the square wave at the instant the second input pulse is received, output connections for the last-named means, integrating means connected to the output connections and responsive to said error voltage producing a change in D. C. output voltage increasing or decreasing at a rate proportional to the amplitude of said error voltage and in direction determined by the polarity of said error voltage, means connecting the output of the integrating means to said delay circuit means to correct the delay and reduce the error voltage to substantially zero with the input of subsequent initiating input pulses whereby the D. C. output voltage is automatically adjusted to a value in proportion to the time interval between successive initiating input and second input pulses, regardless of initial variation in time of the second input pulse.

References Cited in the file of this patent

UNITED STATES PATENTS

| | | |
|---|---|---|
| 2,412,111 | Wilson | Dec. 3, 1946 |
| 2,421,018 | DeRosa | May 27, 1947 |
| 2,499,520 | Modlowski | Mar. 7, 1950 |
| 2,543,072 | Stearns | Feb. 27, 1951 |
| 2,577,536 | MacNichol | Dec. 4, 1951 |

OTHER REFERENCES

1. R. N. Close and M. J. Lebenbaum: Design of Phantastron Time Delay Circuits, Electronics, April 1948.

2. Kelner, Hughes, Berg, Hinkle, and Chance: An Adaptation of the Phantastron Delay Multivibrator Circuit to the 6SA7 Tube, M. I. T. Radiation Laboratory Report No. 63–21.

3. W. H. Eccles and F. W. Jordan: Radio Review No. 1, p. 143, 1919.

4. B. E. Phelps: Dual Triode Trigger Circuits, Electronics, July 1945.

5. L. A. Meacham and E. Peterson: An Experimental Multichannel Pulse Code Modulation System of Toll Quality, Bell System Technical Journal, vol. 27, page 1, January 1948 (see pages 26–27 for sampling circuit).